UNITED STATES PATENT OFFICE.

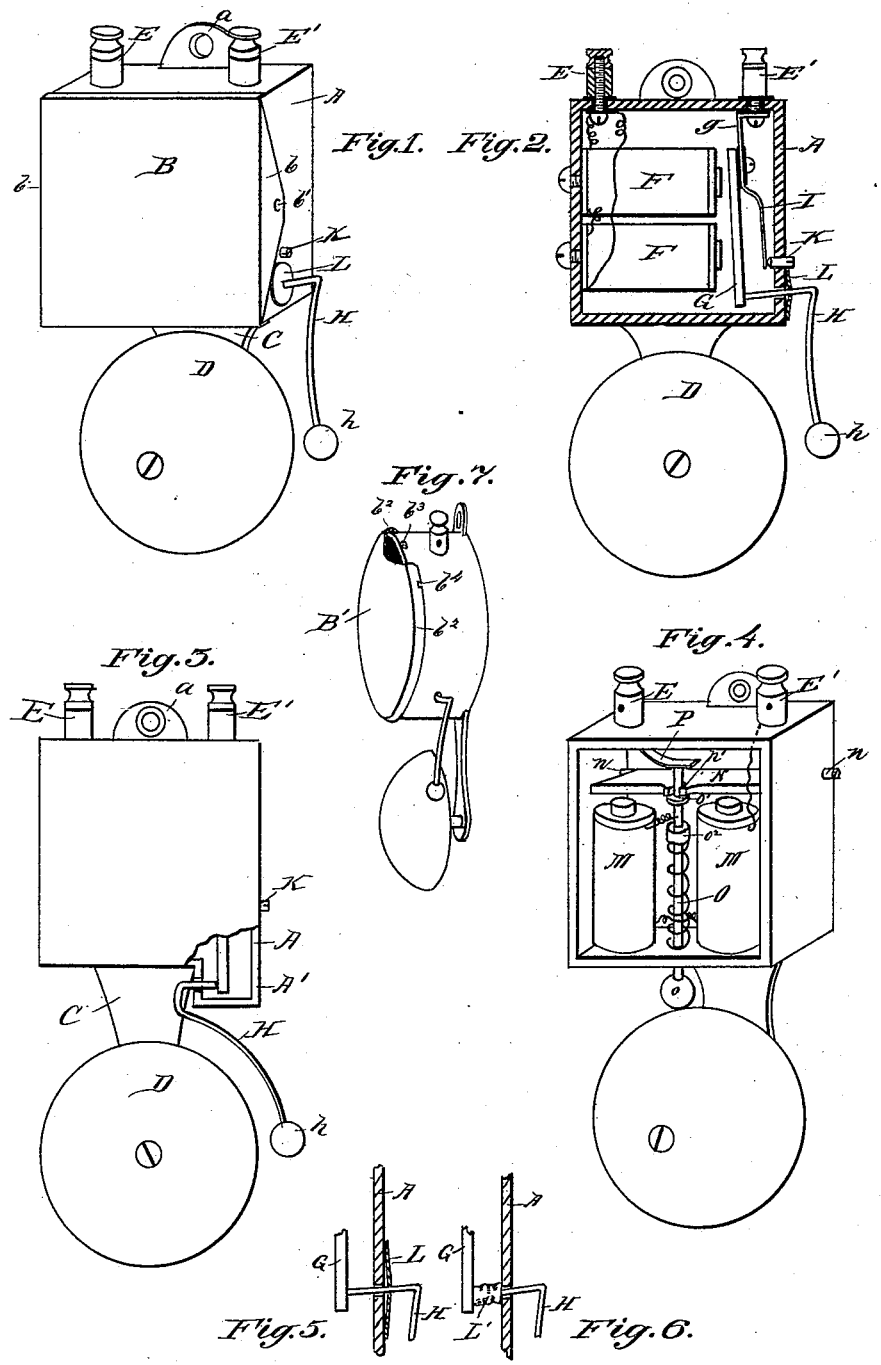

ADAM LÜNGEN, OF NEW YORK, N. Y.

ELECTRIC BELL AND ALARM.

SPECIFICATION forming part of Letters Patent No. 352,472, dated November 9, 1886.

Application filed January 26, 1886. Serial No. 189,773. (No model.)

*To all whom it may concern:*

Be it known that I, ADAM LÜNGEN, a citizen of the United States, and a resident of New York, in the county of New York and State of New York, have invented certain new and useful Improvements in Electric Bells and Alarms, of which the following is a specification.

My invention relates to an electric bell or alarm, the object of my invention being to provide a dust and insect proof case for the operating parts, as hereinafter described.

It consists of a case or box within which to inclose the electro-magnet and vibrating armature, and in so forming the stem which projects from the case and carries the hammer for striking the bell as that it will pass through the said case in the direction of the movement of the vibrating armature, thus requiring only a small opening through the case and admitting of the closing of this aperture by a flexible washer around the stem.

In the accompanying drawings, Figure 1 is a front view of my improved electric bell. Fig. 2 is a vertical transverse section. Fig. 3 shows a modification of the case. Fig. 4 shows a modification in the construction of the bell. Figs. 5 and 6 show the dust-washer in two forms, and Fig. 7 shows a modification of the cover.

The case or box A is preferably made rectangular in shape and with the sides and bottom cast in one piece. The top or cover plate, B, is also made in the form of a rectangular box, slightly larger than the case A, preferably of sheet metal, and with two opposite sides, $b\ b$, of such a depth as to extend well back over the sides of the case A. An inwardly-projecting knob, $b'$, may be made in each of the two sides $b\ b$ of the cover-plate, and corresponding depressions made in the case A, so that the resilience of the parts $b$ of the cover will hold the latter in place on the case.

In case a cylindrical box is used to inclose the working parts of the bell the cover B' (see Fig. 7) is made circular in shape and has a curved rim, $b^2$, formed thereon, which will catch over a lug or lugs, $b^3$, formed upon the case, and openings or notches $b^4$ are cut to allow the cover being pressed over the lugs $b^3$, after which it may be turned partly around and locked.

A projecting bracket, C, attached to or integral with the case A, serves as a support for the bell D. A perforated ear-lug, $a$, upon the side of the case A, opposite to the bracket C and flush with the back of the case, furnishes means whereby the device may be secured in position for use.

Two binding-posts, E E', are secured upon the upper side of the case and both are insulated therefrom.

Within the case A is mounted an electro-magnet, F F, preferably with a double coil, and in front of the pole or poles of this magnet is mounted an armature, G, upon and insulated from a spring-plate, $g$, held in position by the screw which secures the binding-post E' and electrically connected therewith. A rod, H, is secured to or made to form a continuation of the armature G, and is bent to extend outward through the case A in a direction parallel to the movement of said armature, and is then bent downward and made to extend to the bell D in position to strike against the same when the armature G vibrates, and it is armed at its end with a hammer or clapper, $h$. A contact-spring, I, preferably a prolongation of the spring-plate $g$, is mounted upon the back of the armature G, in position to strike against a contact-point formed upon a metallic screw, K, projecting inwardly through a threaded opening in the case A and in a direct contact therewith. The electric connections through the bell are from the binding-post E and through the magnet-coils to the case and contact-screw K, and through the contact-spring I upon the armature and to the binding-post E'. It will be readily seen that in this device the magnet, armature, and contact-points are all inclosed within a tight case, the opening around the stem H being reduced to the minimum by reason of the movement of the latter at the point when it passes through the case being in the direction of its movement, and in order to still further protect against dust and insects I place a soft flexible washer, L, around the stem, and this washer may be secured around its edge to the case A, the central part moving with the stem H.

The washer L may be placed upon the inner face of the case; or in lieu of the washer a short section of thin rubber tubing, L', may be made to surround the stem H and extend from the inner face of the case A to the armature when the latter is at rest or withdrawn from the magnets. (See Fig. 6.)

In Fig. 3 the case is shown as having a rectangular offset, A', at its lower side, and the stem H is made to extend downward within this offset and back out of the rear side and under the magnets, then down and into position to strike the bell D.

In Fig. 4 I have illustrated a modified form of my device, wherein A is the case made rectangular, as in the device shown in Fig. 1, and with similar covering-plate. (Not shown in the figure.) M M are the magnet-coils. N is an armature extending from side to side of the case A and pivoted between two pins, n n, projecting through the case so as to vibrate to and from the magnets, with one of its longer edges as an axial line. In the front or vibrating edges of the armature is formed a notch, n', and through this notch the end of a stem, O, is made to project upward far enough to contact with a contact spring, P, connected with one of the binding-posts, E, and the stem O is prolonged at its lower end to pass out through an opening in the side of the case, and is armed with a hammer or clapper, O, in position to strike a bell or alarm secured to the outside of the case.

The upward movement of the stem O through the notch in the armature is limited by a fixed washer, o', and it is held up against the armature by a spiral spring, which surrounds its lower portion within the case, and compressed between the case A and a fixed ring, o, upon the stem.

The electrical connection is through the bell or from the binding-post E to and around the magnets, to the stem O, to the contact P, and out through the binding-post E. It will be readily seen that when a current is sent through the bell the stem O and the spring-plate P will act as an interrupter, and the bell-hammer o' will be kept vibrating, the stem working in a longitudinal direction through a small opening in the case, and this opening may be closed by a washer, as in the former device.

I do not wish to confine myself to the use of an interrupting-bell, as it is obvious that my improvements will be of great advantage with a single-stroke bell, and, in fact, with any device, when a vibrating armature is used, to give motion to any alarm or indicating device.

What I claim as my invention is—

1. In an electric bell or alarm, the combination, with an electro-magnet and vibrating armature within an inclosing-case, of a striking-stem actuated by said armature and extending out through said case in a direction parallel, or nearly so, to the direction of vibrations of the armature, substantially as and for the purpose set forth.

2. In an electric bell or alarm, the combination, with an electro-magnet, vibrating armature, and striking-stem working through an inclosing-case in the direction of the movement of the armature, of a flexible washer surrounding said stem on one side of the wall of the case, and adapted to close the opening in said wall around the stem, substantially as and for the purpose set forth.

3. In an electric bell or alarm, the combination, with an electro-magnet, a vibrating armature, and an insulated interrupting spring-plate attached to said armature, all inclosed in a metallic case included within the electric circuit with the electro-magnet, of a metallic contact-point projecting through the walls of the case and in direct contact therewith and adjustable from without the case, substantially as and for the purpose set forth.

4. In an electric bell or alarm, the combination, with an electro-magnet and vibrating armature, and with a contact-point connected in circuit with said electro-magnet, of an insulated contact-plate attached to said vibrating armature and insulated therefrom, said contact-plate forming the flexible support for the armature, all as and for the purpose set forth.

5. In an electric bell or alarm, the combination, with an electro-magnet and vibrating armature provided with an insulated contact-spring upon said armature, and with a metallic inclosing-case, of an adjustable metallic contact-point projecting through said case and in direct contact therewith, substantially as and for the purpose set forth.

Signed at New York, in the county of New York and State of New York, this 10th day of August, A. D. 1885.

ADAM LÜNGEN.

Witnesses:
ANDREW W. STEIGER,
WM. L. VAN DERZEE.